United States Patent
Zhou

(10) Patent No.: US 8,069,201 B2
(45) Date of Patent: Nov. 29, 2011

(54) 8×8 TRANSFORM AND QUANTIZATION

(75) Inventor: Minhua Zhou, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1066 days.

(21) Appl. No.: 10/990,917

(22) Filed: Nov. 16, 2004

(65) Prior Publication Data

US 2005/0111554 A1  May 26, 2005

Related U.S. Application Data

(60) Provisional application No. 60/524,831, filed on Nov. 25, 2003.

(51) Int. Cl.
*G06F 7/32* (2006.01)

(52) U.S. Cl. .......... 708/520; 708/400; 375/240.17; 382/205; 382/248

(58) Field of Classification Search .......... 708/400–409
See application file for complete search history.

(56) References Cited

U.S. PATENT DOCUMENTS

| | | | | |
|---|---|---|---|---|
| 5,276,784 | A * | 1/1994 | Ohki | 708/401 |
| 5,854,757 | A * | 12/1998 | Dierke | 708/402 |
| 6,195,466 | B1 * | 2/2001 | Schwartz et al. | 382/250 |
| 6,587,590 | B1 * | 7/2003 | Pan | 708/402 |
| 7,082,450 | B2 * | 7/2006 | Hallapuro et al. | 708/402 |
| 2003/0078953 | A1 * | 4/2003 | Hallapuro et al. | 708/402 |
| 2004/0010528 | A1 * | 1/2004 | Kumar et al. | 708/402 |

* cited by examiner

*Primary Examiner* — Lewis Bullock, Jr.
*Assistant Examiner* — Michael Yaary
(74) *Attorney, Agent, or Firm* — Mirna Abyad; Wade J. Brady, III; Frederick J. Telecky, Jr.

(57) ABSTRACT

Low complexity (16 bit arithmetic) video compression has 8×8 block with transforms using 8×8 integer matrices and quantization with look up table scalar plus constant right shift for all quantization steps. Inverse quantization also a look up table scalar plus right shift dependent upon the quantization step and inverse transform using the 8×8 integer matrices.

5 Claims, 2 Drawing Sheets

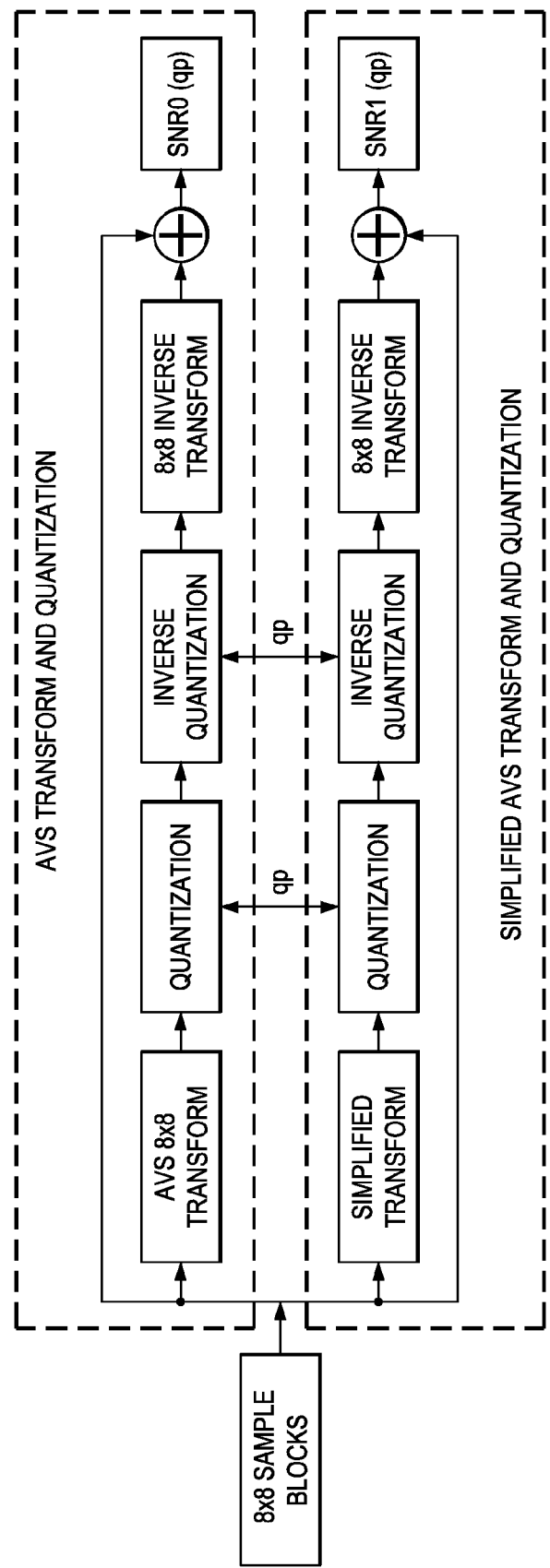

8×8 TRANSFORM AND QUANTIZATION

CROSS-REFERENCE TO RELATED APPLICATIONS

This application claims priority from provisional application No. 60/524,831, filed Feb. 25, 2003.

BACKGROUND OF THE INVENTION

The present invention relates to digital image and video signal processing, and more particularly to block transformation and/or quantization plus inverse quantization and/or inverse transformation.

Various applications for digital video communication and storage exist, and corresponding international standards have been and are continuing to be developed. Low bit rate communications, such as video telephony and conferencing, plus large video file compression, such as motion pictures, led to various video compression standards: H.261, H.263, MPEG-1, MPEG-2, AVS, and so forth. These compression methods rely upon the discrete cosine transform (DCT) or an analogous transform plus quantization of transform coefficients to reduce the number of bits required to encode.

DCT-based compression methods decompose a picture into macroblocks where each macroblock contains four 8×8 luminance blocks plus two 8×8 chrominance blocks, although other block sizes and transform variants could be used. FIG. 2 depicts the functional blocks of DCT-based video encoding. In order to reduce the bit-rate, 8×8 DCT is used to convert the 8×8 blocks (luminance and chrominance) into the frequency domain. Then, the 8×8 blocks of DCT-coefficients are quantized, scanned into a 1-D sequence, and coded by using variable length coding (VLC). For predictive coding in which motion compensation (MC) is involved, inverse-quantization and IDCT are needed for the feedback loop. Except for MC, all the function blocks in FIG. 2 operate on an 8×8 block basis. The rate-control unit in FIG. 2 is responsible for generating the quantization step (qp) in an allowed range and according to the target bit-rate and buffer-fullness to control the DCT-coefficients quantization unit. Indeed, a larger quantization step implies more vanishing and/or smaller quantized coefficients which means fewer and/or shorter codewords and consequent smaller bit rates and files.

There are two kinds of coded macroblocks. An INTRA-coded macroblock is coded independently of previous reference frames. In an INTER-coded macroblock, the motion compensated prediction block from the previous reference frame is first generated for each block (of the current macroblock), then the prediction error block (i.e. the difference block between current block and the prediction block) are encoded.

For INTRA-coded macroblocks, the first (0,0) coefficient in an INTRA-coded 8×8 DCT block is called the DC coefficient, the rest of 63 DCT-coefficients in the block are AC coefficients; while for INTER-coded macroblocks, all 64 DCT-coefficients of an INTER-coded 8×8 DCT block are treated as AC coefficients. The DC coefficients may be quantized with a fixed value of the quantization step, whereas the AC coefficients have quantization steps adjusted according to the bit rate control which compares bit used so far in the encoding of a picture to the allocated number of bits to be used. Further, a quantization matrix (e.g., as in MPEG-4) allows for varying quantization steps among the DCT coefficients.

In particular, the 8×8 two-dimensional DCT is defined as:

$$F(u,v) = \frac{1}{4}C(u)C(v)\sum_{x=0}^{7}\sum_{y=0}^{7}f(x,y)\cos\frac{(2x+1)u\pi}{16}\cos\frac{(2y+1)v\pi}{16}$$

where f(x,y) is the input 8×8 sample block and F(u,v) the output 8×8 transformed block where u,v,x,y=0, 1, ..., 7; and $$C(u), C(v) = \begin{cases} \frac{1}{\sqrt{2}} & \text{for } u,v=0 \\ 1 & \text{otherwise} \end{cases}$$

Note that this transforming has the form of 8×8 matrix multiplications, $F=D^t \times f \times D$, where D is the 8×8 matrix with u,x element $$C(u)\cos\frac{(2x+1)u\pi}{16}.$$

The transform is performed in double precision, and the final transform coefficients are rounded to integer values.

Next, define the quantization of the transform coefficients as $$QF(u,v) = \frac{F(u,v)}{QP}$$

where QP is the quantization factor computed in double precision from the quantization step, qp, as an exponential such as: $QP=2^{qp/8}$. The quantized coefficients are rounded to integer values and are encoded.

The corresponding inverse quantization becomes:

$$F'(u,v)=QF(u,v)*QP$$

with double precision values rounded to integer values.

Lastly, the inverse transformation (reconstructed sample block) is:

$$f'(x,y) = \frac{1}{4}\sum_{u=0}^{7}\sum_{v}^{7}C(u)C(v)F'(u,v)\cos\frac{(2x+1)u\pi}{16}\cos\frac{(2y+1)v\pi}{16}$$

again with double precision values rounded to integer values.

Various alternative approaches, such as the H.264 and AVS standards, simplify the double precision method by using integer transforms and/or different size blocks. In particular, define an 8×8 integer transform matrix, $T_{8\times8}$, with elements analogous to the 8×8 DCT transform coefficients matrix D. Then, with $f_{8\times8}$ and $F_{8\times8}$ denoting the input 8×8 sample data matrix (block of pixels or residuals) and the output 8×8 transform-coefficients block, respectively, define the forward 8×8 integer transform as:

$$F_{8\times8}=T_{8\times8}{}^t \times f_{8\times8} \times T_{8\times8}$$

where "×" denotes 8×8 matrix multiplication, and the 8×8 matrix $T_{8\times8}{}^t$ is the transpose of the 8×8 matrix $T_{8\times8}$.

The quantization of the transformed coefficients may be exponentials of the quantization step as above or may use lookup tables with integer entries. The inverse quantization mirrors the quantization. And the inverse transform also uses $T_{8\times 8}$, and its transpose analogous to the DCT using D and its transpose for both the forward and inverse transforms.

However, these alternative methods still have computational complexity which should be reduced.

SUMMARY OF THE INVENTION

The present invention provides low-complexity 8×8 transformation for image/video processing by partitioning bit shifting and round-off.

The preferred embodiment methods provide for 16-bit operations useful in video coding with motion compensation.

BRIEF DESCRIPTION OF THE DRAWINGS

FIG. 3 shows method comparisons.

DESCRIPTION OF THE PREFERRED EMBODIMENTS

1. Overview

The preferred embodiment low-complexity methods provide simplified 8×8 forward transform which applies to the 16-bit AVS method.

Figure 1A:
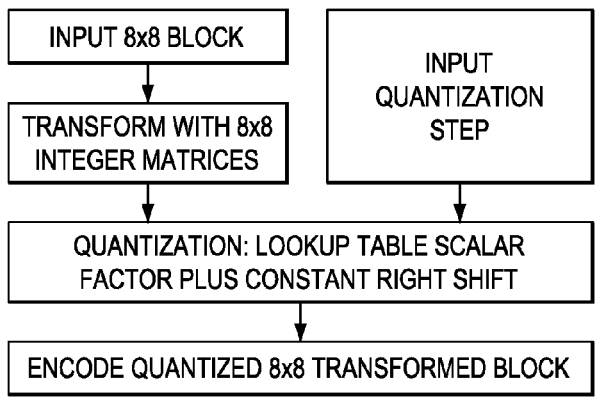
FIGS. 1a-1b are flow diagrams.
Figure 1B:
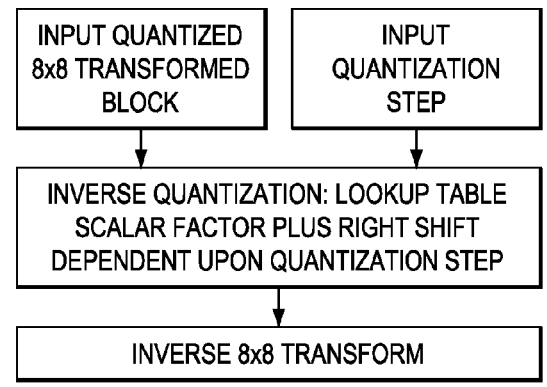
Figure 2:
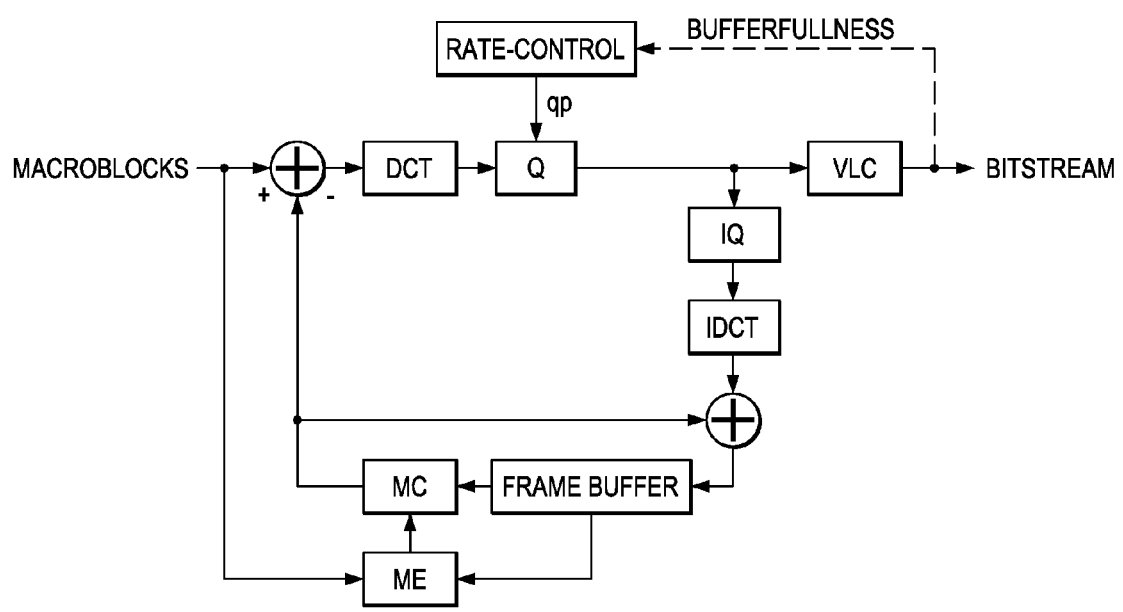
FIG. 2 illustrates a motion compensation video compression with DCT-transformation and quantization.

The methods have application to video compression which operates on 8×8 blocks of (motion-compensated) pixels with DCT transformation and quantization of the DCT-coefficients where the quantization can vary widely. As illustrated in FIG. 2, fullness feedback from the bitstream buffer may determine the quantization factor, which typically varies in the range from 1 to 200-500. FIGS. 1a-1b are transform/quantization of encode and decode flows.

Preferred embodiment systems perform preferred embodiment methods with digital signal processors (DSPs) or general purpose programmable processors or application specific circuitry or systems on a chip (SoC) such as both a DSP and RISC processor on the same chip with the RISC processor controlling. In particular, digital still cameras (DSCs) with video clip capabilities or cell phones with video capabilities could include the preferred embodiment methods. A stored program could be in an onboard ROM or external flash EEPROM for a DSP or programmable processor to perform the signal processing of the preferred embodiment methods. Analog-to-digital converters and digital-to-analog converters provide coupling to the real world, and modulators and demodulators (plus antennas for air interfaces) provide coupling for transmission waveforms.

2. AVS

Initially, consider the AVS transform, quantization, and inverses; the preferred embodiment methods will provide simplifications of the forward transform of AVS.

(a) AVS Forward Transform

The AVS forward 8×8 transform uses the following 8×8 transform matrix, $T_{8\times 8}$, for matrix multiplications with 8×8 sample data matrix (blocks of image pixels or motion residuals) plus an 8×8 scaling matrix, $SM_{8\times 8}$, for scaling the resulting matrix elements. The transform matrix is:

$$T_{8\times 8} = \begin{bmatrix} 8 & 10 & 10 & 9 & 8 & 6 & 4 & 2 \\ 8 & 9 & 4 & -2 & -8 & -10 & -10 & -6 \\ 8 & 6 & -4 & -10 & -8 & 2 & 10 & 9 \\ 8 & 2 & -10 & -6 & 8 & 9 & -4 & -10 \\ 8 & -2 & -10 & 6 & 8 & -9 & -4 & 10 \\ 8 & -6 & -4 & 10 & -8 & -2 & 10 & -9 \\ 8 & -9 & 4 & 2 & -8 & 10 & -10 & 6 \\ 8 & -10 & 10 & -9 & 8 & -6 & 4 & -2 \end{bmatrix}$$

And scaling matrix $SM_{8\times 8} = \{SM_{i,j}: i,j=0, 1, 2, \ldots 7\}$ is:

$$SM_{8\times 8} = \begin{bmatrix} 32768 & 37958 & 36158 & 37958 & 32768 & 37958 & 36158 & 37958 \\ 37958 & 43969 & 41884 & 43969 & 37958 & 43969 & 41884 & 43969 \\ 36158 & 41884 & 39898 & 41884 & 36158 & 41884 & 39898 & 41884 \\ 37958 & 43969 & 41884 & 43969 & 37958 & 43969 & 41884 & 43969 \\ 32768 & 37958 & 36158 & 37958 & 32768 & 37958 & 36158 & 37958 \\ 37958 & 43969 & 41884 & 43969 & 37958 & 43969 & 41884 & 43969 \\ 36158 & 41884 & 39898 & 41884 & 36158 & 41884 & 39898 & 41884 \\ 37958 & 43969 & 41884 & 43969 & 37958 & 43969 & 41884 & 43969 \end{bmatrix}$$

The transform proceeds as follows. First, let $f_{8\times 8} = \{f_{i,j}: i,j=0, 1, 2, \ldots, 7\}$ denote the input 8×8 data matrix and let $F_{8\times 8} = \{F_{i,j}: i,j=0, 1, 2, \ldots, 7\}$ denote the 8×8 output DCT coefficients matrix. The AVS forward transform has two steps and uses an intermediate 8×8 matrix $X_{8\times 8}$:

$$X_{8\times 8} = \{T_{8\times 8}{}^t \times f_{8\times 8} \times T_{8\times 8}\} \triangleright 5$$

$$F_{i,j} = sign(X_{i,j}) * ((|X_{i,j}| * SM_{i,j} + 2^{18}) >> 19) \; i,j = 0, 1, 2, \ldots, 7$$

The following notation is being used here and in the following:

$T_{8\times 8}{}^t$ is the transpose of the transform matrix $T_{8\times 8}$ $X_{8\times 8} = \{X_{i,j}: i,j=0, 1, 2, \ldots, 7\}$ is the intermediate matrix after matrix with the transform matrix and its transpose plus a rounding bit shown above × is matrix multiplication

* is scalar multiplication

|x| is the absolute value of x

Sign(x) is defined as $$sign(x) = \begin{cases} 1 & \text{if } x > 0 \\ -1 & \text{otherwise} \end{cases}$$

$\triangleright$ n is matrix right rounding by n bits; more explicitly, for a matrix $M_{8\times 8} = \{M_{i,j}: i,j=0, 1, 2, \ldots, 7\}$ the operation $m_{8\times 8} = M_{8\times 8} \triangleright n$ is defined by $m_{8\times 8} = \{m_{i,j}: i,j=0, 1, 2, \ldots, 7\}$ where $m_{i,j} = (M_{i,j} + 2^{n-1}) >> n$.

$\gg$ denotes right shifting, which applies to the numbers when expressed in binary notation (e.g., two's complement).

Thus the transform matrix $T_{8\times 8}$ is analogous to the 8×8 DCT matrix and $SM_{8\times 8}$ is a scaling adjustment.

(b) AVS Quantization

The AVS quantization supports 64 quantization steps, qp=0, 1, ..., 63, and uses the following quantization table Q_TAB[64]:

| qp | 0 | 1 | 2 | 3 | 4 | 5 | 6 | 7 |
|---|---|---|---|---|---|---|---|---|
| Q_TAB[qp] | 32768 | 29775 | 27554 | 25268 | 23170 | 21247 | 19369 | 17770 |
| qp | 8 | 9 | 10 | 11 | 12 | 13 | 14 | 15 |
| Q_TAB[qp] | 16302 | 15024 | 13777 | 12634 | 11626 | 10624 | 9742 | 8958 |
| qp | 16 | 17 | 18 | 19 | 20 | 21 | 22 | 23 |
| Q_TAB[qp] | 8192 | 7512 | 6889 | 6305 | 5793 | 5303 | 4878 | 4467 |
| qp | 24 | 25 | 26 | 27 | 28 | 29 | 30 | 31 |
| Q_TAB[qp] | 4091 | 3756 | 3444 | 3161 | 2894 | 2654 | 2435 | 2235 |
| qp | 32 | 33 | 34 | 35 | 36 | 37 | 38 | 39 |
| Q_TAB[qp] | 2048 | 1878 | 1722 | 1579 | 1449 | 1329 | 1218 | 1117 |
| qp | 40 | 41 | 42 | 43 | 44 | 45 | 46 | 47 |
| Q_TAB[qp] | 1024 | 939 | 861 | 790 | 724 | 664 | 609 | 558 |
| qp | 48 | 49 | 50 | 51 | 52 | 53 | 54 | 55 |
| Q_TAB[qp] | 512 | 470 | 430 | 395 | 362 | 332 | 304 | 279 |
| qp | 56 | 57 | 58 | 59 | 60 | 61 | 63 | 63 |
| Q_TAB[qp] | 256 | 235 | 215 | 197 | 181 | 166 | 152 | 140 |

Thus the quantization factor Q_TAB[qp]: is essentially $2^{15-qp/8}$ and the quantization of the transformed matrix $F_{8\times 8}$ is:

$$QF_{i,j}=sign(F_{i,j})*(|F_{i,j}|*Q\_TAB[qp]+\alpha*2^{15})\gg 15$$
$$i,j=0, 1, 2, \ldots, 7$$

where α is quantization control parameter, such as ⅓ for INTRA-coded macroblocks and ⅙ for INTER-coded macroblocks. These quantized coefficients are encoded.

(c) AVS Inverse Quantization

The AVS inverse quantization for an 8×8 quantized DCT coefficient block $QF_{8\times 8}=\{QF_{i,j}: i,j=1, 2, \ldots, 7\}$ is defined as:

$$F'_{ij}=(QF_{ij}*IQ\_TAB[qp]+2^{IQ\_SHIFT[qp]})\ll IQ\_SHIFT[qp]$$
$$i,j=0, 1, 2, \ldots, 7$$

where $F'_{8\times 8}=\{F'_{i,j}: i,j=1, 2, \ldots, 7\}$ is the inverse-quantized DCT coefficients block and the IQ_TAB and IQ_SHIFT tables are defined as:

| qp | 0 | 1 | 2 | 3 | 4 | 5 | 6 | 7 |
|---|---|---|---|---|---|---|---|---|
| IQ_TAB [qp] | 32768 | 36061 | 38968 | 42495 | 46341 | 50535 | 55437 | 60424 |
| IQ_SHIFT [qp] | 14 | 14 | 14 | 14 | 14 | 14 | 14 | 14 |
| qp | 8 | 9 | 10 | 11 | 12 | 13 | 14 | 15 |
| IQ_TAB [qp] | 32932 | 35734 | 38968 | 42495 | 46177 | 50535 | 55109 | 59933 |
| IQ_SHIFT [qp] | 13 | 13 | 13 | 13 | 13 | 13 | 13 | 13 |
| qp | 16 | 17 | 18 | 19 | 20 | 21 | 22 | 23 |
| IQ_TAB [qp] | 65535 | 35734 | 38968 | 42577 | 46341 | 50617 | 55027 | 60097 |
| IQ_SHIFT [qp] | 13 | 12 | 12 | 12 | 12 | 12 | 12 | 12 |
| qp | 24 | 25 | 26 | 27 | 28 | 29 | 30 | 31 |
| IQ_TAB [qp] | 32809 | 35734 | 38968 | 42454 | 46382 | 50576 | 55109 | 60056 |
| IQ_SHIFT [qp] | 11 | 11 | 11 | 11 | 11 | 11 | 11 | 11 |
| qp | 32 | 33 | 34 | 35 | 36 | 37 | 38 | 39 |
| IQ_TAB [qp] | 65535 | 35734 | 38968 | 42495 | 46320 | 50515 | 55109 | 60076 |
| IQ_SHIFT [qp] | 11 | 10 | 10 | 10 | 10 | 10 | 10 | 10 |
| qp | 40 | 41 | 42 | 43 | 44 | 45 | 46 | 47 |
| IQ_TAB [qp] | 65535 | 35744 | 38968 | 42495 | 46341 | 50535 | 55099 | 60087 |
| IQ_SHIFT [qp] | 10 | 9 | 9 | 9 | 9 | 9 | 9 | 9 |
| qp | 48 | 49 | 50 | 51 | 52 | 53 | 54 | 55 |
| IQ_TAB [qp] | 65535 | 35734 | 38973 | 42500 | 46341 | 50535 | 55109 | 60097 |
| IQ_SHIFT [qp] | 9 | 8 | 8 | 8 | 8 | 8 | 8 | 8 |
| qp | 56 | 57 | 58 | 59 | 60 | 61 | 62 | 63 |
| IQ_TAB [qp] | 32771 | 35734 | 38965 | 42497 | 46341 | 50535 | 55109 | 60099 |
| IQ_SHIFT [qp] | 7 | 7 | 7 | 7 | 7 | 7 | 7 | 7 |

Note that IQ_TAB[qp] is a 16-bit positive integer (no sign bit) with a most significant bit (MSB) equal to 1 for all qp, and IQ_SHIFT[qp] is in the range 7-14.

(d) AVS Inverse Transform

The AVS inverse 8×8 transform uses matrix multiplications with the same 8×8 transform matrix, $T_{8\times8}$, and its transpose:

$$f'_{8\times8} = \{T_{8\times8} \times ((F'_{8\times8} \times T_{8\times8}^t) \triangleright 3)\} \triangleright 7$$

where $f'_{8\times8} = \{f'_{i,j}: i,j=1, 2, \ldots, 7\}$ is the reconstructed 8×8 sample data matrix.

3. First Preferred Embodiment

In order to reduce the transform and quantization complexity of the AVS of section 2, the preferred embodiment methods provide a modified forward transform to use together the quantization, inverse quantization, and inverse transformation of section 2. The preferred embodiment methods simplify the computations by eliminating a sign( ) operation and limiting the bit shifting so a 16-bit-based processor operates more efficiently. That is, only the forward transform is modified, and comparisons of the AVS of section with the preferred embodiment methods appear in section 4.

(a) Preferred Embodiment Forward Transform

Recall the AVS forward transform as described in section 2 is:

$$X_{8\times8} = \{T_{8\times8}^t \times f_{8\times8} \times T_{8\times8}\} \triangleright 5$$

$$F_{i,j} = sign(X_{i,j}) * (|X_{i,j}| * SM_{i,j} + 2^{18}) \gg 19)\ i,j=0, 1, 2, \ldots, 7$$

The second step is computationally expensive, especially for 16-bit devices. In order to reduce the complexity, the preferred embodiment methods modify the forward transform second step to essentially split the shift of 19 bits into a shift of N bits plus a shift of 19−N bits in the scaling matrix:

$$F_{i,j} = (X_{i,j} * SM_{i,j}^{(N)} + 2^{N-1}) \gg N \quad i, j = 1, 2, \ldots, 7 \text{ where } SM_{i,j}^{(N)}$$

is defined as $$SM_{i,j}^{(N)} = (SM_{i,j} + 2^{18-N}) \gg (19 - N) \quad i, j = 1, 2, \ldots, 7.$$

where $SM_{8\times8} = \{SM_{i,j}: i,j=1, 2, \ldots, 7\}$ is the scaling matrix defined in section 2 and $$SM_{8\times8}^{(N)} = \{SM_{i,j}^{(N)}: i, j = 1, 2, \ldots, 7\}$$

is the new scaling matrix.

In this transform N is the number of shift bits and the performance improves as N increases (see the next section); but for 16-bit processor complexity reduction, N is taken to be less than or equal to 16.

For example, with N=16:

$$SM_{8\times8}^{16} = \begin{bmatrix} 4096 & 4745 & 4520 & 4745 & 4096 & 4745 & 4520 & 4745 \\ 4745 & 5496 & 5236 & 5496 & 4745 & 5496 & 5236 & 5496 \\ 4520 & 5236 & 4987 & 5236 & 4520 & 5236 & 4987 & 5236 \\ 4745 & 5496 & 5236 & 5496 & 4745 & 5496 & 5236 & 5496 \\ 4096 & 4745 & 4520 & 4745 & 4096 & 4745 & 4520 & 4745 \\ 4745 & 5496 & 5236 & 5496 & 4745 & 5496 & 5236 & 5496 \\ 4520 & 5236 & 4987 & 5236 & 4520 & 5236 & 4987 & 5236 \\ 4745 & 5496 & 5236 & 5496 & 4745 & 5496 & 5236 & 5496 \end{bmatrix}$$

Note that $$SM_{8\times8}^{(N)}$$

is essentially equal to $SM_{8\times8}$ of section 2 when N=19, and for each decrement of N by 1 the matrix elements are all divided by 2 with a final round off.

Compared to the AVS forward transform described in section 2, the preferred embodiment has much lower complexity because of the elimination of the sign(x) operation and the limitation of memory accesses and right shifts all within 16 bits. Thus, the preferred embodiment method makes the section 2 described AVS forward transform more computationally-cost-effective.

(b) Preferred Embodiment Quantization

The preferred embodiment methods use the same quantization as described in section 2.

(c) Preferred Embodiment Inverse Quantization

The preferred embodiment methods use the same inverse quantization as described in section 2.

(d) Preferred Embodiment Inverse Transform

The preferred embodiment methods use the same inverse transform as described in section 2.

Experimental Results

Simulations ere carried out to test the efficiency of the preferred embodiment simplified forward transform. In the following Table, the column "Anchor T&Q" shows the signal-to-noise ratio (SNR0) for applications of the AVS transform plus quantization followed by inverse quantization plus inverse transform described in section 2. The "Simplified T&Q" columns show the signal-to-noise ratios (SNR1) and differences from the SNR0 of the same blocks for applications of the preferred embodiment forward transform for various values of N together with AVS quantization followed by AVS inverse quantization and AVS inverse transform; that is, only the forward transform is changed in these cases, everything else remains the same. All quantization steps (qp=0, 1, 2, . . . 63) are tested. Each qp is tested with 6000 random 8×8 blocks, the pixel values lie in the range of [−255: 255]. The SNR values between the input sample blocks and their reconstructed blocks are computed (see FIG. 3) over all the test sample blocks for each qp. The results for N=16, 15, 14, 13, 12, 11 are listed in the Table.

| qp | Anchor SNR0[dB] | Simplified T&Q N = 16 SNR1[dB](Δ dB) | Simplified T&Q N = 15, 14 SNR1[dB](Δ dB) | Simplified T&Q N = 13 SNR1[dB](Δ dB) | Simplified T&Q N = 12 SNR1[dB](Δ dB) | Simplified T&Q N = 11 SNR1[dB](Δ dB) |
|---|---|---|---|---|---|---|
| 0 | 60.088 | 60.125 (0.037) | 60.072 (−0.016) | 60.033 (−0.055) | 59.075 (−1.013) | 58.307 (−1.780) |
| 1 | 54.157 | 54.129 (−0.028) | 54.149 (−0.008) | 54.160 (0.004) | 53.972 (−0.184) | 53.789 (−0.368) |
| 2 | 54.077 | 54.070 (−0.007) | 54.061 (−0.016) | 54.042 (−0.035) | 53.861 (−0.216) | 53.704 (−0.373) |
| 3 | 53.898 | 53.907 (0.009) | 53.892 (−0.007) | 53.868 (−0.031) | 53.783 (−0.115) | 53.648 (−0.250) |

-continued

| qp | Anchor SNR0[dB] | Simplified T&Q N = 16 SNR1[dB](Δ dB) | Simplified T&Q N = 15, 14 SNR1[dB](Δ dB) | Simplified T&Q N = 13 SNR1[dB](Δ dB) | Simplified T&Q N = 12 SNR1[dB](Δ dB) | Simplified T&Q N = 11 SNR1[dB](Δ dB) |
|---|---|---|---|---|---|---|
| 4 | 53.723 | 53.700 (−0.023) | 53.709 (−0.014) | 53.705 (−0.018) | 53.588 (−0.135) | 53.436 (−0.286) |
| 5 | 53.376 | 53.380 (0.004) | 53.369 (−0.008) | 53.367 (−0.009) | 53.260 (−0.116) | 53.105 (−0.271) |
| 6 | 52.461 | 52.456 (−0.006) | 52.466 (0.004) | 52.454 (−0.008) | 52.380 (−0.081) | 52.253 (−0.209) |
| 7 | 51.873 | 51.882 (0.010) | 51.883 (0.010) | 51.897 (0.024) | 51.805 (−0.068) | 51.747 (−0.125) |
| 8 | 51.472 | 51.460 (−0.012) | 51.440 (−0.032) | 51.450 (−0.021) | 51.388 (−0.084) | 51.232 (−0.239) |
| 9 | 51.071 | 51.079 (0.009) | 51.075 (0.005) | 51.060 (−0.011) | 51.028 (−0.043) | 50.970 (−0.100) |
| 10 | 50.727 | 50.734 (0.007) | 50.714 (−0.012) | 50.700 (−0.027) | 50.617 (−0.110) | 50.563 (−0.163) |
| 11 | 50.189 | 50.171 (−0.019) | 50.163 (−0.026) | 50.157 (−0.032) | 50.108 (−0.082) | 50.049 (−0.141) |
| 12 | 49.445 | 49.451 (0.006) | 49.451 (0.006) | 49.450 (0.005) | 49.396 (−0.049) | 49.327 (−0.118) |
| 13 | 48.857 | 48.847 (−0.010) | 48.860 (0.003) | 48.843 (−0.014) | 48.798 (−0.059) | 48.753 (−0.104) |
| 14 | 48.386 | 48.397 (0.011) | 48.387 (0.001) | 48.391 (0.005) | 48.361 (−0.025) | 48.321 (−0.065) |
| 15 | 47.783 | 47.776 (−0.007) | 47.778 (−0.006) | 47.778 (−0.006) | 47.758 (−0.026) | 47.704 (−0.079) |
| 16 | 46.495 | 46.495 (0.001) | 46.502 (0.007) | 46.553 (0.058) | 46.430 (−0.065) | 46.416 (−0.078) |
| 17 | 46.554 | 46.548 (−0.005) | 46.544 (−0.010) | 46.542 (−0.012) | 46.521 (−0.033) | 46.497 (−0.057) |
| 18 | 45.753 | 45.751 (−0.002) | 45.757 (0.004) | 45.756 (0.003) | 45.735 (−0.018) | 45.715 (−0.038) |
| 19 | 45.074 | 45.081 (0.007) | 45.082 (0.007) | 45.079 (0.004) | 45.039 (−0.036) | 45.027 (−0.048) |
| 20 | 44.468 | 44.467 (−0.001) | 44.470 (0.003) | 44.462 (−0.006) | 44.441 (−0.026) | 44.429 (−0.039) |
| 21 | 43.666 | 43.672 (0.005) | 43.674 (0.008) | 43.671 (0.004) | 43.650 (−0.017) | 43.647 (−0.020) |
| 22 | 42.961 | 42.955 (0.001) | 42.963 (0.001) | 42.961 (−0.000) | 42.955 (−0.007) | 42.939 (−0.023) |
| 23 | 42.217 | 42.216 (−0.000) | 42.216 (−0.000) | 42.212 (−0.004) | 42.214 (−0.002) | 42.209 (−0.007) |
| 24 | 41.471 | 41.470 (−0.001) | 41.470 (−0.001) | 41.448 (−0.023) | 41.470 (−0.001) | 41.466 (−0.005) |
| 25 | 40.983 | 40.985 (0.002) | 40.983 (0.000) | 40.983 (0.000) | 40.977 (−0.006) | 40.964 (−0.019) |
| 26 | 40.087 | 40.088 (0.001) | 40.087 (0.000) | 40.093 (0.006) | 40.093 (0.006) | 40.078 (−0.008) |
| 27 | 39.423 | 39.424 (0.001) | 39.425 (0.002) | 39.426 (0.003) | 39.418 (−0.005) | 39.411 (−0.012) |
| 28 | 38.602 | 38.606 (0.004) | 38.606 (0.003) | 38.607 (0.005) | 38.597 (−0.005) | 38.597 (−0.005) |
| 29 | 37.875 | 37.876 (0.001) | 37.877 (0.002) | 37.878 (0.003) | 37.871 (−0.004) | 37.866 (−0.009) |
| 30 | 37.141 | 37.140 (−0.001) | 37.140 (−0.001) | 37.140 (−0.001) | 37.137 (−0.004) | 37.130 (−0.011) |
| 31 | 36.396 | 36.396 (−0.000) | 36.398 (0.001) | 36.400 (0.003) | 36.390 (−0.007) | 36.388 (−0.008) |
| 32 | 35.526 | 35.526 (0.000) | 35.526 (0.000) | 35.529 (0.003) | 35.521 (−0.005) | 35.520 (−0.006) |
| 33 | 34.853 | 34.853 (0.000) | 34.853 (0.000) | 34.854 (0.001) | 34.851 (−0.002) | 34.852 (−0.001) |
| 34 | 34.180 | 34.179 (−0.000) | 34.178 (−0.001) | 34.179 (−0.000) | 34.180 (0.001) | 34.176 (−0.004) |
| 35 | 33.388 | 33.388 (−0.000) | 33.387 (−0.000) | 33.386 (−0.002) | 33.382 (−0.006) | 33.382 (−0.006) |
| 36 | 32.660 | 32.660 (0.000) | 32.660 (0.000) | 32.660 (−0.000) | 32.659 (−0.001) | 32.659 (−0.002) |
| 37 | 31.881 | 31.880 (−0.000) | 31.881 (−0.000) | 31.881 (0.001) | 31.880 (−0.001) | 31.879 (−0.001) |
| 38 | 31.149 | 31.149 (0.000) | 31.149 (0.000) | 31.148 (−0.000) | 31.148 (−0.001) | 31.147 (−0.002) |
| 39 | 30.382 | 30.382 (0.001) | 30.382 (0.001) | 30.382 (0.000) | 30.381 (−0.001) | 30.379 (−0.003) |
| 40 | 29.635 | 29.635 (−0.000) | 29.635 (0.000) | 29.636 (0.001) | 29.634 (−0.001) | 29.633 (−0.002) |
| 41 | 28.872 | 28.873 (0.000) | 28.872 (−0.000) | 28.872 (−0.000) | 28.874 (0.002) | 28.872 (0.000) |
| 42 | 28.170 | 28.171 (−0.000) | 28.170 (0.000) | 28.170 (−0.001) | 28.171 (0.001) | 28.169 (−0.001) |
| 43 | 27.382 | 27.382 (−0.000) | 27.382 (0.000) | 27.383 (0.000) | 27.383 (0.000) | 27.383 (0.000) |
| 44 | 26.616 | 26.616 (0.000) | 26.616 (0.000) | 26.616 (0.000) | 26.616 (−0.000) | 26.616 (−0.000) |
| 45 | 25.884 | 25.884 (0.000) | 25.884 (0.000) | 25.884 (0.000) | 25.883 (−0.001) | 25.883 (−0.001) |
| 46 | 25.131 | 25.131 (0.000) | 25.131 (0.000) | 25.131 (0.000) | 25.131 (0.000) | 25.131 (−0.000) |
| 47 | 24.371 | 24.371 (−0.000) | 24.371 (−0.000) | 24.371 (−0.000) | 24.371 (−0.000) | 24.370 (−0.001) |
| 48 | 23.637 | 23.637 (0.000) | 23.637 (0.000) | 23.637 (0.000) | 23.636 (−0.001) | 23.636 (−0.001) |
| 49 | 22.890 | 22.890 (−0.000) | 22.890 (−0.000) | 22.890 (−0.000) | 22.890 (−0.000) | 22.889 (−0.001) |
| 50 | 22.165 | 22.164 (−0.000) | 22.164 (−0.000) | 22.164 (−0.000) | 22.164 (−0.000) | 22.164 (−0.000) |
| 51 | 21.418 | 21.418 (0.000) | 21.418 (0.000) | 21.418 (0.000) | 21.418 (−0.000) | 21.418 (−0.000) |
| 52 | 20.657 | 20.657 (−0.000) | 20.657 (−0.000) | 20.657 (0.000) | 20.657 (0.000) | 20.657 (−0.000) |
| 53 | 19.892 | 19.892 (−0.000) | 19.892 (−0.000) | 19.892 (−0.000) | 19.892 (−0.000) | 19.892 (−0.000) |
| 54 | 19.117 | 19.117 (0.000) | 19.117 (−0.000) | 19.117 (−0.000) | 19.117 (−0.000) | 19.117 (−0.000) |
| 55 | 18.353 | 18.353 (−0.000) | 18.353 (0.000) | 18.353 (−0.000) | 18.353 (−0.000) | 18.353 (−0.000) |
| 56 | 17.616 | 17.616 (0.000) | 17.616 (0.000) | 17.616 (0.000) | 17.615 (−0.000) | 17.615 (−0.000) |
| 57 | 16.872 | 16.872 (0.000) | 16.872 (0.000) | 16.872 (0.000) | 16.872 (−0.000) | 16.872 (0.000) |
| 58 | 16.129 | 16.129 (−0.000) | 16.129 (−0.000) | 16.129 (−0.000) | 16.129 (0.000) | 16.129 (0.000) |
| 59 | 15.422 | 15.422 (0.000) | 15.422 (0.000) | 15.422 (0.000) | 15.422 (0.000) | 15.422 (0.000) |
| 60 | 14.709 | 14.709 (−0.000) | 14.709 (−0.000) | 14.709 (−0.000) | 14.709 (−0.000) | 14.709 (−0.000) |
| 61 | 14.045 | 14.045 (0.000) | 14.045 (0.000) | 14.045 (0.000) | 14.045 (−0.000) | 14.045 (−0.000) |
| 62 | 13.404 | 13.404 (0.000) | 13.404 (0.000) | 13.404 (0.000) | 13.404 (−0.000) | 13.404 (0.000) |
| 63 | 12.853 | 12.853 (0.000) | 12.853 (−0.000) | 12.853 (−0.000) | 12.853 (−0.000) | 12.853 (−0.000) |

As shown in the Table, as long as N≧13, the preferred embodiment simplified forward transform method performs almost identically to the AVS forward transform. However, significant loss at high-end blocks (>50 dB area) begins to appear when N≦12.

Since for 16-bit devices the complexity is almost the same as long as N≦16, the preferred embodiment simplified transform method (16≧N≧13) provides the same compression efficient as the current AVS transform design, but at lower computational complexity.

5. Modifications

The preferred embodiment methods can be modified in various ways while retaining the feature of the simplified forward transform.

For example, the round-off could varied or . . . ???.

What is claimed is:

1. An image processing method of a digital processor for generating at least one digital image, utilizing at least one matrix, comprising:

(a) transforming, in said digital processor, an 8×8 sample data matrix into an 8×8 intermediate matrix using the 8×8 transform matrix:

$$T_{8\times 8} = \begin{bmatrix} 8 & 10 & 10 & 9 & 8 & 6 & 4 & 2 \\ 8 & 9 & 4 & -2 & -8 & -10 & -10 & -6 \\ 8 & 6 & -4 & -10 & -8 & 2 & 10 & 9 \\ 8 & 2 & -10 & -6 & 8 & 9 & -4 & -10 \\ 8 & -2 & -10 & 6 & 8 & -9 & -4 & 10 \\ 8 & -6 & -4 & 10 & -8 & -2 & 10 & -9 \\ 8 & -9 & 4 & 2 & -8 & 10 & -10 & 6 \\ 8 & -10 & 10 & -9 & 8 & -6 & 4 & -2 \end{bmatrix};$$

(b) scaling said intermediate matrix using a scaling matrix; and (c) shifting the elements of said scaled intermediate matrix by N bits to yield a transformed matrix, where N is an integer in the range of 13 to 16; wherein said transformed matrix is utilized in manipulating at least a portion of said image and accordingly generating a digital image.

2. The image processing method of claim 1, wherein:

(a) the elements of said scaling matrix are shifts by 19-N bits of the elements of a second scaling matrix.

3. An image processing method of a digital processor for generating at least one digital image, utilizing at least one matrix, comprising:

(a) multiplying, in said digital processor, a n×n sample data matrix with a n×n transform matrix and the n×n transpose of said transform matrix to yield a coefficient matrix;

(b) selecting an integer N less than Nmax;

(c) shifting said coefficient matrix with round off by N bits to give a shifted coefficient matrix;

(d) providing a scaling matrix corresponding to said Nmax;

(e) shifting said scaling matrix with round off by Nmax-N bits to give a shifted scaling matrix;

(f) scaling said shifted coefficient matrix with said shifted scaling matrix; and (g) wherein said transform matrix is:

$$T_{8\times 8} = \begin{bmatrix} 8 & 10 & 10 & 9 & 8 & 6 & 4 & 2 \\ 8 & 9 & 4 & -2 & -8 & -10 & -10 & -6 \\ 8 & 6 & -4 & -10 & -8 & 2 & 10 & 9 \\ 8 & 2 & -10 & -6 & 8 & 9 & -4 & -10 \\ 8 & -2 & -10 & 6 & 8 & -9 & -4 & 10 \\ 8 & -6 & -4 & 10 & -8 & -2 & 10 & -9 \\ 8 & -9 & 4 & 2 & -8 & 10 & -10 & 6 \\ 8 & -10 & 10 & -9 & 8 & -6 & 4 & -2 \end{bmatrix}$$

and wherein said transformed matrix is utilized in manipulating at least a portion of said image and accordingly generating a digital image.

4. The method of claim 3, wherein:

(a) Nmax is 19 and said scaling matrix is:

$$SM_{8\times 8} = \begin{bmatrix} 32768 & 37958 & 36158 & 37958 & 32768 & 37958 & 36158 & 37958 \\ 37958 & 43969 & 41884 & 43969 & 37958 & 43969 & 41884 & 43969 \\ 36158 & 41884 & 39898 & 41884 & 36158 & 41884 & 96898 & 41884 \\ 37958 & 43969 & 41884 & 43969 & 37958 & 43969 & 41884 & 43969 \\ 32768 & 37958 & 36158 & 37958 & 32768 & 37958 & 36158 & 37958 \\ 37958 & 43969 & 418884 & 43969 & 37958 & 43969 & 41884 & 43969 \\ 36158 & 41884 & 39898 & 41884 & 36158 & 41884 & 39898 & 41884 \\ 37958 & 43969 & 41884 & 43969 & 37958 & 43969 & 41884 & 43969 \end{bmatrix}.$$

5. A non-transitory computer memory containing computer instructions that when executed by at least one of a computer or a processor causes the computer to perform a method for image processing, comprising the steps of:

(a) transforming an 8×8 sample data matrix into an 8×8 intermediate matrix using the 8×8 transform matrix:

$$T_{8\times 8} = \begin{bmatrix} 8 & 10 & 10 & 9 & 8 & 6 & 4 & 2 \\ 8 & 9 & 4 & -2 & -8 & -10 & -10 & -6 \\ 8 & 6 & -4 & -10 & -8 & 2 & 10 & 9 \\ 8 & 2 & -10 & -6 & 8 & 9 & -4 & -10 \\ 8 & -2 & -10 & 6 & 8 & -9 & -4 & 10 \\ 8 & -6 & -4 & 10 & -8 & -2 & 10 & -9 \\ 8 & -9 & 4 & 2 & -8 & 10 & -10 & 6 \\ 8 & -10 & 10 & -9 & 8 & -6 & 4 & -2 \end{bmatrix};$$

(b) scaling said intermediate matrix using a scaling matrix; and (c) shifting the elements of said scaled intermediate matrix by N bits to yield a transformed matrix, where N is an integer in the range of 13 to 16, wherein said transformed matrix is utilized in manipulating at least a portion of said image.

* * * * *